United States Patent Office 3,201,922
Patented Aug. 24, 1965

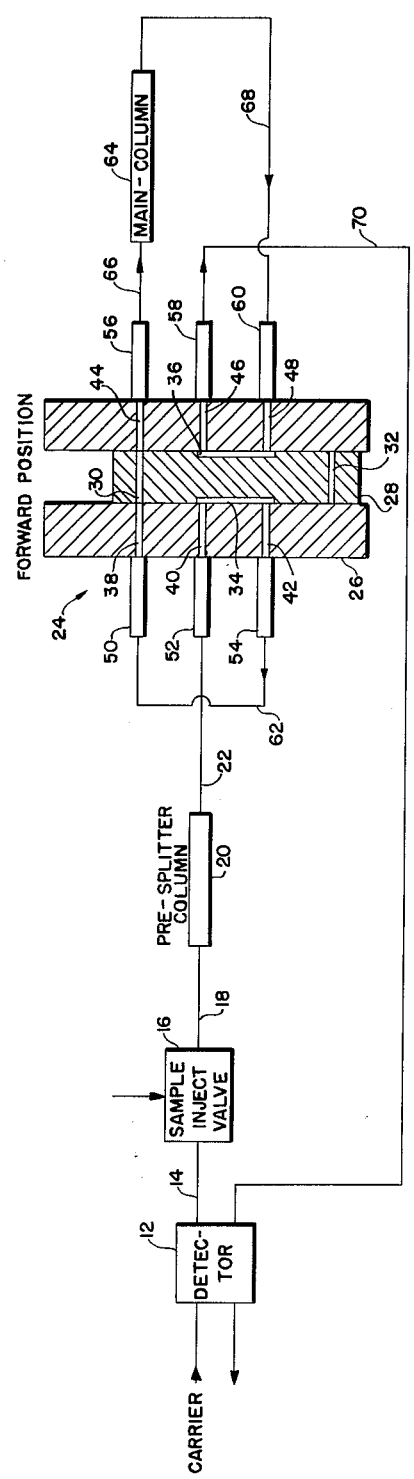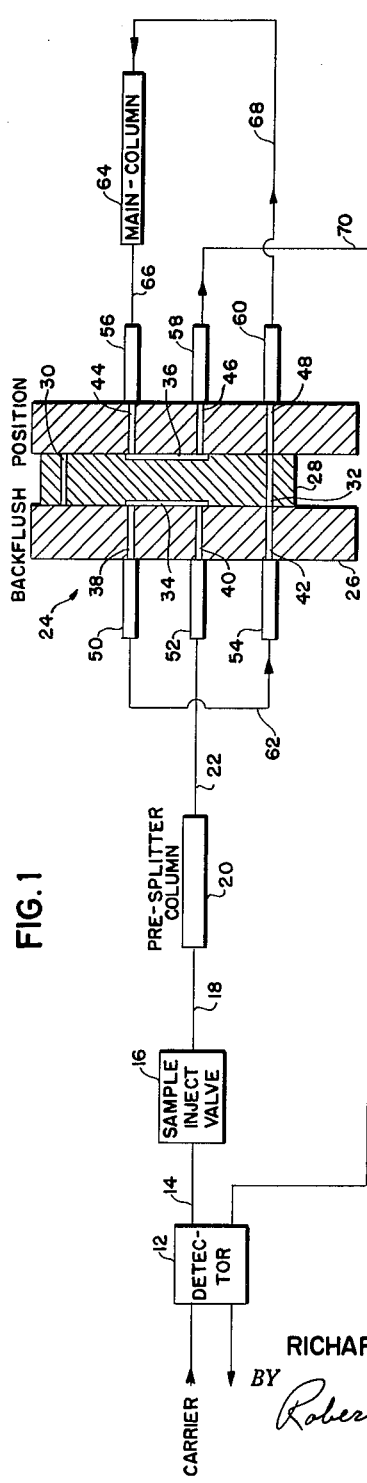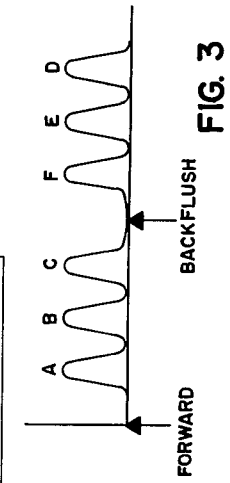

3,201,922
CHROMATOGRAPHIC METHOD
Richard Villalobos, Anaheim, Calif., assignor to Beckman Instruments, Inc., a corporation of California
Filed Feb. 7, 1962, Ser. No. 171,757
1 Claim. (Cl. 55—67)

This invention relates to gas chromatography and more particularly relates to a multiple column chromatographic method for separating sample components having widely different characteristics.

In the last several years, gas chromatography has become an increasingly important technique in determining the components present in a sample to be analyzed. In this technique, the sample is pushed through either an adsorption or a partition column by a suitable carrier gas. The column may be packed with a variety of materials and serves to separate the components in accordance with their partition coefficients which determine their elution time from the column. In cases where the components of interest have short elution times but are difficult to separate, a long column is used and the column then backflushed to remove any components having longer elution time in order to reduce the time for analysis. In circumstances where the components of interest have long elution times but are otherwise easy to separate, columns as short as possible are used in order to reduce the analysis time.

In cases where samples have components of interest of each of these types, it is undesirable to use either a very long or a very short column as in the former case the analysis time will be too long, while in the latter the resolution of the separation of the components having a short elution time will be unacceptable. In order to overcome this difficulty, a number of attempts have been made to provide multiple column systems. One such system utilizes a pair of columns connected in series with a restrictor connected in parallel with the downstream column by a suitable valve. The components with the short elution time are pushed through the first column into the second column and the valve is then switched to couple the restrictor into the system and by-pass the second column. The components having longer elution times are then pushed through the remainder of the first column and through the restrictor to the detector. The valve is then switched again and the components having short elution times are eluted from the second column into the detector. In this system, it is possible to provide a second column long enough to adequately separate the faster components, but if components having intermediate elution times are present, the first column still presents a problem because if it is short enough to elute the slowest component in a resonable time it does not have sufficient resolution to separate the intermediate components.

Another proposed solution to this problem involves the use of a triple column configuration. Such a configuration, however, requires the use of two valves as well as the three columns and thus, while satisfactory in operation, is quite expensive. Still another solution envisions the use of two alternately connected columns and the injection of two samples, one of which is analyzed by one column and the other of which is analyzed by the second column. This solution is undesirable if the sample is limited.

According to the present invention, it has now been found that a method and column configuration may be provided that permits the separation of components having long elution times and components having short elution times from a single sample by using only two columns and a single valve. This result is achieved by providing an initial pre-splitter column in conjunction with a main column and a valve arrangement for backflushing the main column. The present invention thus provides an arrangement which performs a long sought-after function in a reasonable time with accuracy and with a minimum of equipment.

It is therefore a primary object of the present invention to provide a gas chromatographic method for separating components having both long elution times and short elution times from a single sample.

It is another object of the present invention to provide such a method which requires only two columns and a single valve.

It is also an object of the present invention to provide a gas chromatographic method using a pre-splitter column, a main column, and a valving arrangement for backflushing the main column.

These and further objects and advantages of the invention will become more apparent upon reference to the following specification and claims and appended drawings wherein:

FIG. 1 illustrates schematically the arrangement of the columns and the position of the valve when the system is in the forward position;

FIG. 2 illustrates schematically the arrangement of the columns and the position of the valve when the system is in the backflush position; and FIG. 3 illustrates the output from a detector that will be obtained according to the present invention.

Referring now to FIG. 1, the system is shown with the valve in a forward position. In this configuration, a suitable carrier gas, for example helium, is passed through one channel of an appropriate detector 12, such as a thermal conductivity detector. The carrier gas is then directed through a conduit 14 to a sample inject valve 16 by means of which a sample is injected into the flowing stream of carrier gas. The resultant binary stream flows through a conduit 18 to the inlet of a pre-splitter column 20. This pre-splitter column 20 is a relatively short column and serves to separate the sample components having longer elution times (heavy constituents) while not appreciably affecting separation between the components having shorter elution times (light constituents).

After leaving the pre-splitter column 20, the flowing stream is directed by a conduit 22 to a valve, generally indicated at 24. This valve may be of any suitable type and, as shown, is provided with a stationary body portion 26 and a sliding valve member 28. The valve member 28 is provided with a pair of transverse passages 30 and 32 and a pair of longitudinal passages 34 and 36. The valve body 26 is provided with a plurality of passages 38, 40, 42, 44, 46 and 48 which are adapted to cooperate with the passages 30, 32, 34 and 36 in the sliding member 28. Each of the passages 38, 40, 42, 44, 46 and 48 is provided with an inlet or outlet connector 50, 52, 54, 56, 58, and 60, respectively.

The connectors 50 and 54 are coupled by a suitable conduit 62 while the connector 56 is coupled to a main column 64 by means of a conduit 66. The other end of the main column 64 is coupled to the connector 60 by a conduit 68. The main column 64, as well as the pre-splitter column 20, may be either a partition or an adsorption column as required and may be packed with any suitable material for the particular analysis to be conducted. The main column is of sufficient length to separate the sample components having a short elution time. The connector 58 is coupled by a suitable conduit 70 to the second or measuring channel of the detector 12.

In the position shown in FIG. 1, the effluent from the pre-splitter column 20 travels through the conduit 22 and into the connector 52. The effluent then passes through the passage 40 in the valve body 26, the passage 34 in the sliding member 28, the passage 42 in the valve body 26 and out the connector 54. It then travels through the conduit 62 and connector 50, passage 38, passage 30, passage 44, connector 56 and conduit 66 into one end of the main column 64. The effluent from the column 64 passes through the conduit 68, the connector 60, the passage 48 in the valve body 26, the longitudinal passage 36 in the sliding member 28, the passage 46 in the valve body 26, the connector 58, and the conduit 70 to the second or measuring channel of the detector 12.

When the valve is positioned in this manner, the components of the sample having a shorter elution time enter the main column 64 in a forward direction together with the slower compoments of the sample which have been separated in the pre-splitter column 20. As the faster moving components move through the main column 64 and are eluted therefrom, the slower moving components in their already separated state enter only a short distance into the column 64, depending on their individual characteristics. The faster moving components are passed to the detector 12 where their peaks are recorded in the conventional manner.

Referring now to FIG. 2, the system is shown after the valve 24 has been switched to its backflush position. This switching takes place after the faster moving components have been detected and their peaks recorded, all of which usually occurs at a time well before the elution of any of the slower moving components from the column 64. In this configuration, the carrier gas flows through the detector 12, conduit 14, sample inject valve 16, conduit 18, pre-splitter column 20, and conduit 22 into the connector 52 of the valve 24. The carrier gas then flows through the passage 40 of the valve body 26 and the longitudinal passage 34 of the sliding member 28. Because of the changed position of this sliding member, however, the carrier gas now flows out through the passage 38 in the valve body 26, through the connector 50 and conduit 62 into the connector 54. The gas stream then flows through the valve 24 by means of the passages 42, 32, and 48 and emerges from the connector 60. The carrier gas is thus coupled by the conduit 68 to what was previously the output end of the main column 64 and thus serves to backflush this column.

The backflushing carrier gas stream causes the slower components to be eluted from the main column in the reverse order to which they entered the column. Because of their different elution times, the components resume the separation that was imparted to them by the pre-splitter column 20. The carrier and sample components are eluted from the end of the main column 64 and pass through the conduit 66 to the connector 56. The gas stream flows through the valve 24 by way of the passage 44, passage 36, and passage 46 and emerges from the connector 58. The gas stream then flows through the conduit 70 to the measuring side of the detector 12 where the peaks of the slower components are detected and recorded in the inverse order to which they entered the main column 64, that is, in the inverse order of their elution times.

The above operation may be seen by referring to FIG. 3, which shows the form that the detector output would take. In this figure, the sample is assumed to have six components; A, B, C, D, E, and F, having elution times in that order, i.e., A being the shortest and F being the longest. When the valve is in the forward position of FIG. 1, the peaks A, B and C are detected by the detector 12 as previously explained. The valve is then switched to the backflush position and the component peaks D, E, and F emerge from the main column 64. As explained previously, these peaks emerge in the reverse order so that the detector or recorder output will indicate these peaks as F–E–D rather than the reverse which would normally be the case. For example a mixture containing methane, ethane, propane, n-butane, n-pentane, and n-octane, corresponding to A, B, C, D, E, and F, respectively, in FIG. 3 would emerge in the following order methane, ethane, propane, n-octane, n-pentane, and n-butane.

The method described above thus permits the inexpensive, accurate and quick analysis of a sample which contains a plurality of components having widely different elution times. This is accomplished by providing a pre-splitter column which separates the slower traveling components so that they may be backflushed from a main column without regrouping them into a single peak.

The invention may be embodied in other specific forms not departing from the spirit or essential characteristics thereof. The present embodiment is therefore to be considered in all respects as illustrative and not restrictive, the scope of the invention being indicated by the appended claim rather than by the foregoing description and all changes which come within the meaning and range of equivalency of the claim are therefore intended to be embraced therein.

I claim:

A method of chromatograph separation and analysis for a number of light and heavy constituents comprising the steps of:

injecting a sample containing light and heavy constitutents in a stream of carrier gas, passing the stream containing the sample and carrier gas through a pre-splitter chromatographic column and through a value to a main chromatographic column until all the sample has entered the main column, passing the light constituents in the sample and carrier gas from the main column through the valve to a detector, switching the valve to reverse the flow of carrier gas in the main column while maintaining the flow of carrier gas in the same direction as before in the pre-splitter column and to connect the end of the main column where the sample previously entered directly to the detector.

References Cited by the Examiner

UNITED STATES PATENTS

| | | | |
|---|---|---|---|
| 2,868,011 | 1/59 | Coggeshall | 55—197 |
| 2,981,092 | 4/61 | Marks | 73—23.1 |
| 3,016,106 | 1/62 | Luft | 55—197 |
| 3,030,798 | 4/62 | Lichtenfels | 55—386 |
| 3,041,869 | 7/62 | Spracklen et al. | 55—386 |
| 3,062,038 | 11/62 | Ayers | 55—74 |
| 3,068,686 | 12/62 | Harmon | 55—67 |
| 3,097,518 | 7/63 | Taylor et al. | 55—197 |
| 3,097,519 | 7/63 | Favre | 73—23.1 |
| 3,111,835 | 11/63 | Jenkins | 73—23.1 |
| 3,119,251 | 1/64 | Bowers | 73.23.1 |

FOREIGN PATENTS

| | | |
|---|---|---|
| 812,538 | 4/59 | Great Britain. |
| 135,688 | 9/60 | Russia. |

OTHER REFERENCES

Beaker et al.: "Multiple Columns in Chromatography," Control Engineering, January 1961, pp. 77–81.

Janak, J.: "Chromatograficka Semimkroanalysa Plynn IV," Analysa Plynnych Parafinn, Chemicke Listy, 1953, pp. 1184–1189.

Simmons et al.: "Two-Stage Gas-Liquid Chromatography," Analytical Chemistry, vol. 30, No. 1, January 1958, pp. 32–35.

Martin et al.: "Compact Two-Stage Gas Chromatograph for Flash Pyrolysis Studies," Analytical Chemistry, vol. 33, No. 8, July 1961, pp. 982–985.

REUBEN FRIEDMAN, *Primary Examiner.*

HARRY B. THORNTON, *Examiner.*